Oct. 27, 1970  J. R. METZ  3,535,750
RELEASABLE SPRING LATCH
Filed Aug. 13, 1968
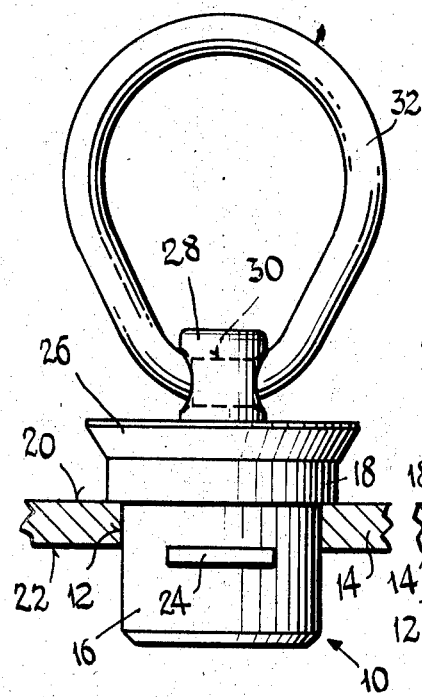
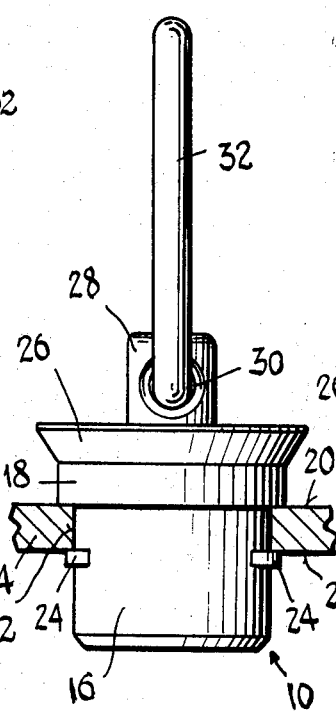
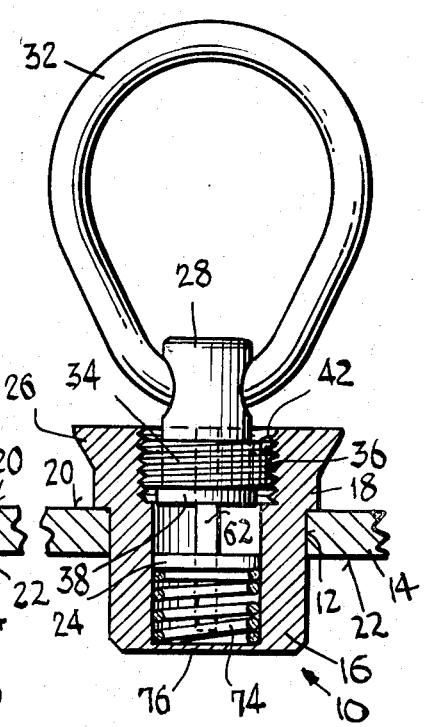
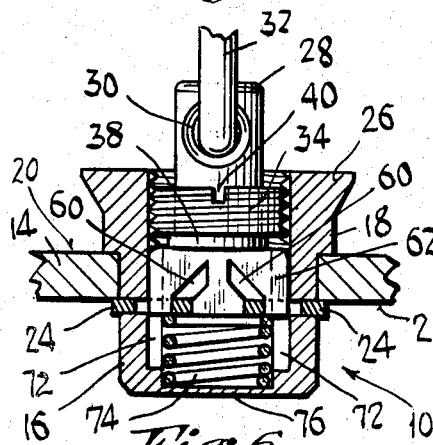
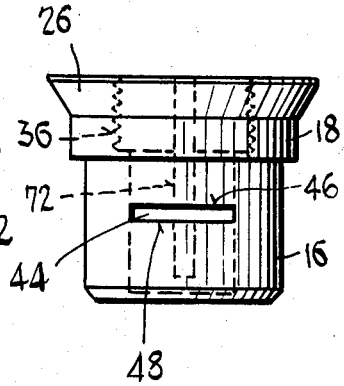
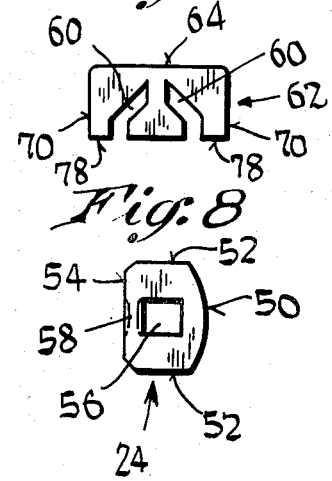
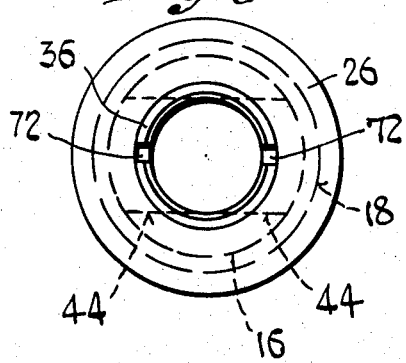
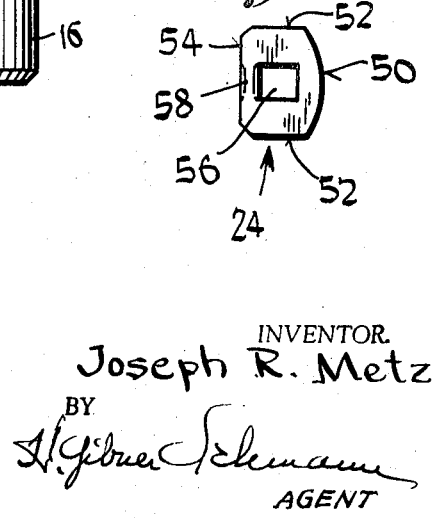
INVENTOR.
Joseph R. Metz
BY
AGENT

United States Patent Office 3,535,750
Patented Oct. 27, 1970

3,535,750
RELEASABLE SPRING LATCH
Joseph R. Metz, Ridgefield, Conn., assignor to Norco, Inc., Ridgefield, Conn., a corporation of Connecticut
Filed Aug. 13, 1968, Ser. No. 752,359
Int. Cl. A44b 17/00; F16b 13/04
U.S. Cl. 24—211                                      10 Claims

ABSTRACT OF THE DISCLOSURE

A releasable latch comprising a plug part having an end plunger which, when pushed, retracts two locking dogs that normally project from the opposite sides. The plunger includes a flat cam plate which is disposed within the plug part and which, at its opposite edges, slides in longitudinal grooves of the plug part. The foremost end of the plug part is closed, being like a cup in which lubricant can be kept to lubricate and preserve the inner working parts against rust, contamination, dirt and the like.

PERTINENT PRIOR ART

U.S. Pat. No. 3,184,816; U.S. Pat. No. 3,386,137; U.S. Pat. No 3,390,874.

Cross references to related applications (1) Copending application of Joseph R. Metz, Ser. No. 638,014 filed May 12, 1967, entitled "Quick Release Pin," and having common ownership with the present application.

(2) Copending application of Joseph R. Metz, Ser. No. 636,801 filed May 8, 1967, entitled "Automatically Cocking Quick Release Fastener," and having common ownership with the present application.

(3) Copending application of John J. McCarthy, Ser. No. 652,914, filed July 12, 1967, entitled "Quick-Release Threaded Bolt" and having common ownership with the present application.

(4) Copending application of Robert E. Betts, Ser. No. 660,290, filed Aug. 14, 1967, entitled "Releasable Locking Device," and having common ownership with the present application.

BACKGROUND

This invention relates to releasable spring latches, and more particularly to latches of the type wherein a plug-like body has retractable side fingers which are actuated by a central plunger protruding from an end of the body.

In the past a wide variety of such spring latches has been proposed and produced. These prior latches have, as a rule, operated satisfactorily under general conditions of use. However, where exacting requirements are specified as to reliability, freedom from malfunctioning and breakage, resistance to vibration and the like, many prior devices were not satisfactory. Prior parts made as castings were susceptable to cracking and rupture when used severally or under conditions of impact. Additionally, loss of lubricant, or poor conditions of lubrication resulted in impaired or more difficult functioning of the moving parts.

SUMMARY

The above drawbacks of prior spring latches are obviated by the present invention, which has for an object the provision of an improved latch part which is especially sturdy and rugged, and resistant to severe forces, vibration and heavy usage while at the same time being simple, constituted of few parts and conducive to good lubrication and to the retention of the lubricant.

Other objects and advantages of the invention involve the small and compact construction of the latch part, the relatively large bearing surfaces provided for the movable parts, the direct actions and connections between the parts, the simplicity of the parts themselves and the quick and easy assembly of the same whereby there is had an especially serviceable and foolproof end product.

Other features and advantages will hereinafter appear.

In the drawings:

FIG. 1 is a side elevational view of a plug-like latch member as provided by the invention, shown mounted in an opening of a supporting plate.

FIG. 2 is a side elevational view of the plug-like member of FIG. 1, taken at 90° to the plane of the preceding figure.

FIG. 3 is an axial sectional view taken through the latching plug of FIG. 1, revealing interior details.

FIG. 4 is an axial sectional view taken through the plug as shown in FIG. 2.

FIG. 5 is a side elevational view of the plug body per se.

FIG. 6 is a top plan view of the plug of FIG. 4 but with the handle ring removed, also the plunger and bearing bushing.

FIG. 7 is a plan view of the cam plate as provided in the latching plug.

FIG. 8 is a plan view of one of the locking dogs of the latching plug.

Referring first to FIGS. 1 and 2, the latching plug part as shown therein is indicated generally by the numeral 10, said plug part being carried in a suitable opening 12 of a supporting plate 14 which may, for example, be the deck plate of a boat, a plate portion of a fitting secured to a support member, or any other similar structure.

The plug part 10 comprises a cylindrical body portion 16 which fits into the aperture 12, and an annular shoulder portion 18 engaged with one surface 20 of the plate 14. Engaged with the opposite surface 22 of the plate 14 are locking, projecting dogs 24 which when extended as shown securely hold the plug body 16 in the plate 14 as in FIGS. 1 and 2.

The plug body 16 also has an outwardly flared end portion 26, from which there projects a plunger 28 provided with a cross hole or opening 30 through which a hand ring 32 extends. The construction of the latching plug part 10 is such tha the locking dogs 24 will be retracted or shifted radially inward from the positions illustraed in FIG. 2 when the plunger 28 is depressed or shifted axially inward with respect to the body 16.

In accordance with the present invention a novel and improved construction is provided within the plug body 16, to effect the actuation or retraction of the locking dogs 24 in response to inward shifting movement of the plunger member 28.

Referring to FIGS. 3-8 it will be seen that the plunger member 28 is slidably carried in an externally threaded bearing bushing 34 which is screwed into a threaded bore area 36 provided within the cylindrical and flared portions 18, 26 of the plug body 16. The plunger member 28 has an annular outward-projecting shoulder portion 38 at its inner end, engaged with the inner end of the threaded plug 34 and constituting a stop to limit the outward movement of the member. The bearing bushing 34 has slots 40 to accommodate a driving tool for threading the bushing into the plug body. When the desired position of the bushing into the plug body. When the desired position of the bushing is attained, the plug body is staked at one place into one of the slots 40 of the bushing, as indicated at 42 in FIG. 3. The staking will fix the position of the bushing 34 in conjunction with the screw threads thereof, whereby it will be held against axial shifting in the plug body.

Referring to FIGS. 4, 5, 6 and 8, the locking dogs 24 are seen to complete flat metal stampings which are carried in oppositely disposed slots 44 provided in opposite side wall portions of the plug body 16. The slots 44 are shown as extending circumferentially each through approximately a 90° arc whereby they have curved upper and lower surfaces 46, 48 as indicated in FIG. 5. By such construction, when the flat locking dogs 24 are slidably carried in the slots 44 there is virtually no possibility of tilting or canting of the dogs, assuming that a snug sliding fit is initially provided by virtue of the dimensions and tolerances adopted. The arcuate nature of the slots 44 thus provides an adequate support for the locking dogs whereby the latter can withstand powerful forces when the plug part 10 is assembled to the deck plate 14 as shown in FIGS. 1 and 2.

The locking dogs 24 have arcuate outer edges 50, straight side edges 52, and straight inside edges 54. The dogs have rectangular apertures 56 forming straight actuator or follower portions 58 the edges of which are sightly chamfered as indicated in FIG. 8.

The follower portions 58 of the locking dogs 24 are received in angular cam slots 60 of a cam plate 62 which is disposed within the plug body 16 with its upper, straight edge 64 engaged with the inner shouldered end portion 38 of the plunger member 28.

Opposite side edge portions 70 of the cam plate 62 are slidably carried in opposite longitudinal grooves 72 provided in the bore of the plug body 16. By such arrangement, the cam plate 62 is accurately and reliably guided and supported for axial movement in the plug body 16, and is prevented from canting or binding therein.

Within the plug body 16 a helical compression coil spring 74 is provided, at one end engaged with an integral transverse end wall 76 of the body and at its other end engaged with edge portions 78 of the cam plate 62 as clearly seen in FIG. 4. The coil spring 74 normally maintains the plunger member 28 in its outermost, projected position as illustrated in FIGS. 1–4, such spring being more compressed when the plunger member is depressed to shift the cam plate 62 toward the bottom wall 76 of the plug body. This movement of the plate 62 will cause the cam slots 60 to be traversed by the follower portions 58 of the locking dogs 24, thereby shifting the latter radically inward or retracting them. This in turn will effect a release of the plug part 10 from the deck plate 14, as can be understood. When the depressing force is removed from the plunger member 28, the spring 74 will return the cam plate and plunger member to the raised positions illustrated in FIGS. 3 and 4, causing the locking dogs 24 to be again shifted to their extended positions.

It will be observed that both the plunger member 28 and the cam plate 62 have relatively large bearing surfaces, respectively in the threaded bushing 34 and the grooved plug body 16. Also, by virtue of the locking dogs 24 having large bearing surfaces in the slots 44, in conjunction with the chamfering of the follower portions 58 of the dogs there is had a smooth, reliable action of the latch when the plunger member 28 is depressed, and also when it is extended under the action of the compression spring 74.

In addition to the foregoing, the closed or enclosed nature of the latching plug 10 enables an effective lubrication of the various working parts to be maintained. A close sliding fit exists between the plunger member 58 and the bore of the threaded bushing 34, and close sliding fits exist between the locking dogs 24 and the slots in the walls of the plug body 16. Accordingly, a viscous or grease-like lubricating substance may be advantageously contained within the plug body, such lubricant serving the purpose of lubricating all of the relatively movable and rubbing parts, such as the spring 74, locking dogs 24, cam plate 62, and the plunger member 28. Moreover, the closed nature of the latching plug part 10 will serve to retain such lubricant within the plug body whereby rusting, corrosion and wear of the working parts of the latch will be held to a minimum, and whereby the entry of dirt and other contaminating substances will be minimized.

It will be understood that a cable, chain, hook or the like may be secured to the hand ring 32, whereby the latch may be used for various purposes such as the holding down of cargo, etc. on the deck of a vessel. Pulling forces applied to the ring 32 will not result in release of the latch part, but instead such release can only be effected by applying a pushing force downward on the hand ring 32. While such pushing force is being exerted, a suitable tool placed underneath the flared portion 26 of the plug body 16 can exert a counter or lifting force, to effect the separation of the plug part 10 from the plate 14.

It will now be seen from the foregoing that I have provided a novel and improved, sturdy and especially reliable plug-like latching part which is particularly simple in its construction, easily and quickly assembled, and economically fabricated. The latch part may be easily operated, and is well adapted to withstand considerable forces and severe usage. Moreover, the working parts are mostly enclosed, and the plug body will tend to retain lubricant therein, minimizing friction, wear, corrosion and the like.

Variations and modifications are possible, and portions of the improvement may be used without others.

I claim:

1. A latch comprising, in combination:
   (a) a tubular body having a pair of openings in its side walls, disposed diametrically opposite each other,
   (b) locking dogs slideable in said openings between outward, extended locking positions protruding from the sides of the body, and inward retracted unlocking positions wherein they do not protrude,
   (c) an operable plunger movable axially in said body and extending from one end thereof, said plunger being movable between an inner releasing position and an outer locking position,
   (d) a bearing in the body, carrying said plunger and limiting the outward movement thereof,
   (e) a cam plate axially movable in the body,
   (f) said body having a pair of oppositely located grooves disposed parallel to its axis, in which the cam plate is disposed and guided,
   (g) means including a driving connection between the plunger and cam plate, for actuating the latter when the plunger is operated,
   (h) cooperable means on the cam plate and locking dogs, effecting concurrent movement of the plate and dogs to shift the latter to their inward releasing positions when the plunger is moved to its releasing position, and to shift the dogs to their extended locking positions when the plunger is moved to its outer, locking position.

2. A latch as in claim 1, wherein:
   (a) said means for actuating the cam plate includes a coil spring disposed in the body and engaged with said plate,
   (b) said driving connection comprising adjacent portions of the cam plate and plunger, abutting each other.

3. A latch as in claim 2, wherein:
   (a) the bore of the body at one end thereof is internally threaded,
   (b) said bearing comprising a bushing having threads engaged with the threads of the body,
   (c) said plunger having an end flange engaged with one end of the bushing and constituting a stop for the plunger,
   (d) said end flange constituting the portion of the plunger which abuts the cam pate.

4. A latch as in claim 3, wherein:
   (a) the cam plate has one edge adjacent the coil spring, in which there are two slots extending toward an opposite edge of the plate,
   (b) said slots dividing said one edge into a central portion and two outer portions, (c) parts of said outer portions of said one edge occupying said grooves,
(d) said coil spring engaging other parts of said outer edge portions.
5. A latch as in claim 4, wherein:
(a) the slots in the cam plate are angle-shaped and have camming edges,
(b) said locking dogs having portions occupying the cam plate slots, whereby the dogs are actuated when the cam plate is moved.
6. A latch as in claim 5, wherein:
(a) the locking dogs have openings through them,
(b) said cam plate having opposite side portions riding in said grooves of the body and extending through the openings of the dogs.
7. A latch as in claim 6, wherein:
(a) the other end of the body has an integral transverse wall constiuting a fluid-tight closure,
(b) said coil spring abutting said integral transverse wall,
(c) said other end of the body constituting a seamless well for lubricant, in which the coil spring is disposed.
8. A latch as in claim 7, wherein:
(a) the said opposite side portions of the cam plate are receivable in said well to receive lubricant therefrom.
9. A latch as in claim 8, wherein:
(a) the cam plate has a central portion disposed between the slots thereof and receivable in said well to receive lubricant therefrom.
10. A latch as in claim 1, wherein:
(a) said one end of the tubular body has outwardly projecting shoulders adjacent the plunger, for engagement by a lifting tool to raise the body at the time that the plunger is being shifted to its inner, releasing position.

References Cited

UNITED STATES PATENTS

| 3,386,137 | 6/1968 | McCarthy | 24—211 |
| 3,390,712 | 7/1968 | McKay | 24—211 X |

FOREIGN PATENTS 846,029   9/1939   France.

BERNARD A. GELAK, Primary Examiner

U.S. Cl. X.R.

85—66